(12) United States Patent
Honji

(10) Patent No.: US 10,044,999 B2
(45) Date of Patent: Aug. 7, 2018

(54) IMAGE PROCESSING TO CONVERT IMAGE WITH A LOW DYNAMIC RANGE INTO IMAGE WITH THE ORIGINAL HIGH DYNAMIC RANGE

(71) Applicant: SONY CORPORATION, Tokyo (JP)

(72) Inventor: Hidetaka Honji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/630,791

(22) Filed: Feb. 25, 2015

(65) Prior Publication Data

US 2015/0256807 A1 Sep. 10, 2015

(30) Foreign Application Priority Data

Mar. 5, 2014 (JP) .................. 2014-042859

(51) Int. Cl.
*H04N 9/77* (2006.01)
*H04N 11/24* (2006.01)
*H04N 5/20* (2006.01)

(52) U.S. Cl.
CPC .............. *H04N 9/77* (2013.01); *H04N 5/20* (2013.01); *H04N 11/002* (2013.01)

(58) Field of Classification Search
CPC .................... H04N 9/73; H04N 9/77
USPC ......... 348/453, 450, 644, 645, 687; 345/589
See application file for complete search history.

(56) References Cited

U.S. PATENT DOCUMENTS

| 2006/0158535 A1* | 7/2006 | Komori | H04N 1/60 348/254 |
| 2013/0033517 A1* | 2/2013 | Choi | H04N 1/60 345/593 |
| 2016/0372057 A1* | 12/2016 | Katsu | G09G 3/2092 |

FOREIGN PATENT DOCUMENTS

| JP | 2007-208382 A | 8/2007 |
| JP | 2013-255301 A | 12/2013 |

* cited by examiner

*Primary Examiner* — Brian Yenke
*Assistant Examiner* — Jean W Desir
(74) *Attorney, Agent, or Firm* — Chip Law Group

(57) ABSTRACT

An image processing device includes a luminance signal expansion unit which expands a luminance signal, and a chroma signal correction unit which corrects a chroma signal in a manner adjusted to the expansion of the luminance signal.

8 Claims, 11 Drawing Sheets

IMAGE PROCESSING TO CONVERT IMAGE WITH A LOW DYNAMIC RANGE INTO IMAGE WITH THE ORIGINAL HIGH DYNAMIC RANGE

CROSS REFERENCE TO RELATED APPLICATIONS

This application claims the benefit of Japanese Priority Patent Application JP 2014-042859 filed Mar. 5, 2014, the entire contents of which are incorporated herein by reference.

BACKGROUND

The present disclosure relates to an image processing device and an image processing method which process a high dynamic range image, and to an image display device.

Recently, according to the increasing bit-depth of imaging elements (imaging sensors), there is progress in the adoption of high dynamic range (HDR) images. An HDR image has a contrast ratio between the maximum brightness color and the minimum brightness color of, for example, 10000:1 or greater, and can realistically represent the real world. The HDR image has merits such as being capable of realistically representing shading, being capable of simulating exposure, and being capable of representing glare. Incidentally, a standard dynamic range (SDR) image generally has a contrast ratio of, for example, 1000:1, 256:1 or lower, has a low dynamic range, and is often expressed using 256 grades of device primary colors such as red, green, and blue, or cyan, magenta, and yellow.

For example, an imaging device which synthesizes an HDR image from a plurality of imaged images with different exposures is proposed (for example, refer to Japanese Unexamined Patent Application Publication No. 2013-255301).

A camera used in the image production of television programming or the like normally has a function of capturing HDR images. However, many household television receivers used to view the television programming do not support HDR images. Therefore, even if the camera used in the image production is capable of capturing HDR images, in practice, the HDR image is converted into an image with a compressed dynamic range, edited, and subsequently transmitted as a broadcast signal in consideration of the fact that the compressed image can be displayed as it is by a household television receiver, that is, in consideration of downward compatibility. A master monitor that is used for editing the image by the broadcasting station has a white luminance of approximately 100 nits, the high luminance information that is captured is compressed, gradation is damaged, and the sense of presence is lost.

Incidentally, on a general household television, a dynamic range that is reduced to approximately one fortieth, for example, is standard, that is, standard dynamic range (SDR). The SDR image has a contrast ratio of, for example, 1000:1, 256:1 or lower, has a low dynamic range, and is often expressed using 256 grades of device primary colors such as red, green, and blue, or cyan, magenta, and yellow.

It is possible to convert an HDR image into an SDR image using Knee compression. Knee compression is a process of suppressing a high luminance portion of a signal such that the luminance of the image is kept within a predetermined dynamic range (here, the SDR dynamic range). For example, an imaging device which subjects an image signal that is output form an imaging element to Knee compression and keeps the dynamic range within a predetermined luminance level is proposed (for example, refer to Japanese Unexamined Patent Application Publication No. 2007-208382).

Recently, the commercial sale of displays which support HDR in which the maximum luminance is 500 nits or 1000 nits started. However, as described above, even though the image is originally an HDR image, since the image is broadcast as an SDR image, the waste of viewing the SDR image using an HDR supporting television occurs.

SUMMARY

It is desirable to provide an image processing device, an image processing method, and an image display device, each of which is excellent and capable of converting an image with a low dynamic range or an image that is compressed to a standard dynamic range into an image with the original high dynamic range.

According to an embodiment of the present technology, there is provided an image processing device which includes a luminance signal expansion unit which expands a luminance signal, and a chroma signal correction unit which corrects a chroma signal in a manner adjusted to the expansion of the luminance signal.

In the embodiment, the chroma signal correction unit of the image processing device may correct the chroma signal such that a ratio of the luminance signal to the chroma signal is fixed between before and after the expansion of the luminance signal by the luminance signal expansion unit.

In the embodiment, the image processing device may further include a chroma signal expansion unit which expands the chroma signal after the chroma signal is corrected by the chroma signal correction unit.

In the embodiment, the chroma signal expansion unit of the image processing device may expand the chroma signals in a range that does not fall outside of a display color gamut.

According to another embodiment of the present technology, an image processing method includes expanding a luminance signal, and correcting a chroma signal in a manner adjusted to the expansion of the luminance signal.

According to still another embodiment of the present technology, an image display device includes a luminance signal expansion unit which expands a luminance signal, a chroma signal correction unit which corrects a chroma signal in a manner adjusted to the expansion of the luminance signal, and a display unit which converts the luminance signal and the chroma signal into an RGB signal and displays the RGB signal.

According to the technology disclosed in the present specification, it is possible to provide an image processing device, an image processing method, and an image display device, each of which is excellent and capable of converting an image with a low dynamic range or an image that is compressed to a standard dynamic range into an image with the original high dynamic range.

Note that, the effects described in the present specification are merely exemplary, and the effects of the present disclosure are not limited thereto. There is a case in which the present disclosure has additional effects other than those described above.

Other aims, characteristics and merits of the technology disclosed in the present specification will become clear due to a detailed description based on the embodiment and attached drawings described later.

DETAILED DESCRIPTION OF EMBODIMENTS

Hereinafter, embodiments of the technology disclosed in the present specification will be described in detail with reference to the drawings.

Figure 1:
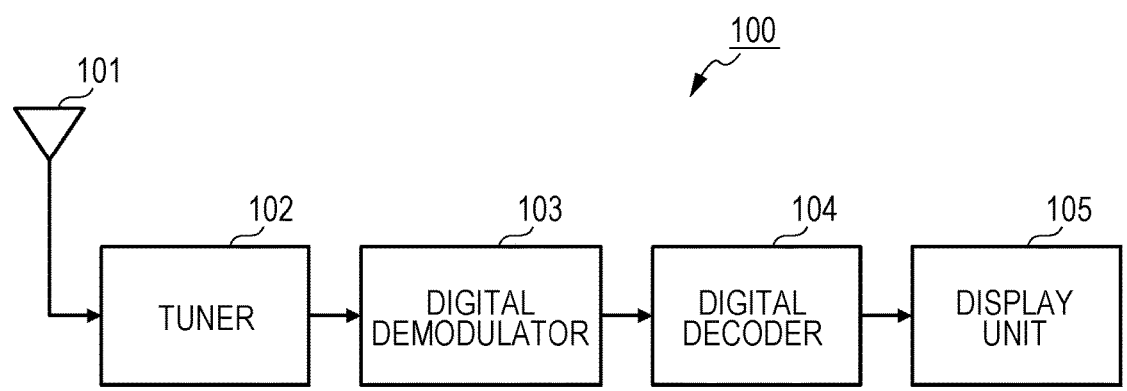
FIG. 1 is a diagram schematically illustrating a configuration example of an image display device to which the technology disclosed in the present specification can be applied.

FIG. 1 schematically illustrates a configuration example of an image display device 100 to which the technology disclosed in the present specification can be applied.

Transmitted radio waves such as terrestrial digital broadcasting and satellite digital broadcasting are input to an antenna 101. A tuner 102 selectively amplifies and frequency converts a desired radio wave from among the signals that are supplied from the antenna 101. A digital demodulator 103 detects a received signal that is subjected to frequency conversion, demodulates the signal using a system corresponding to the (broadcasting station side) digital modulation system that is employed during transmission, and performs transmission error correction. A digital decoder 104 decodes a digital demodulated signal and outputs image signals Y, Cb, and Cr to a display unit 105.

Figure 2:
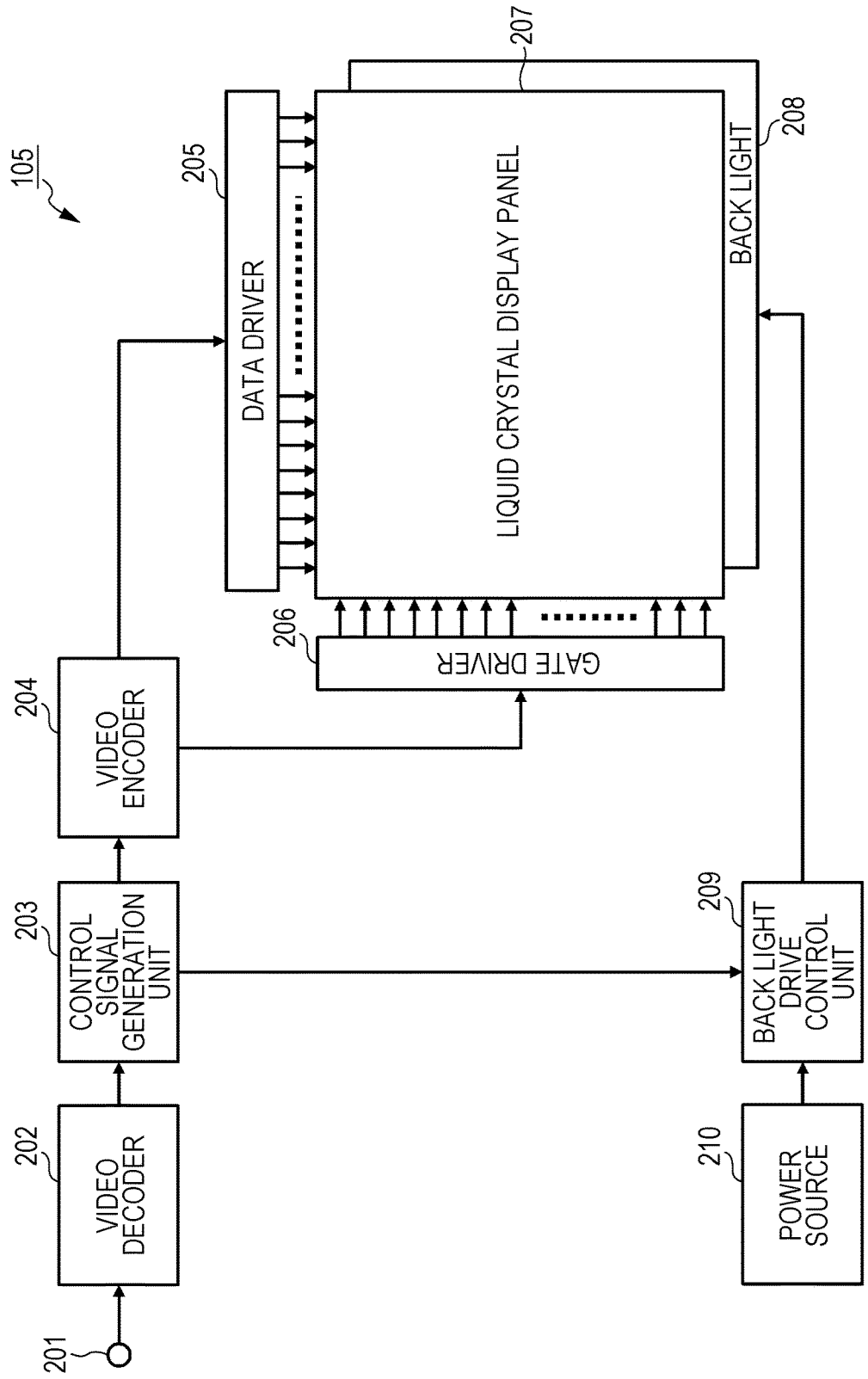
FIG. 2 is a diagram schematically illustrating a configuration example of a case in which a display unit uses a liquid crystal display system.

FIG. 2 schematically illustrates a configuration example of a case in which the display unit 105 uses a liquid crystal display system.

A video decoder 202 subjects the image signals which are input from the digital decoder 104 via an input terminal 201 to signal processing such as chroma processing, converts the image signal into an RGB image signal of a resolution appropriate for driving a liquid crystal display panel 207, and outputs the RGB image signal, together with a horizontal synchronization signal H and a vertical synchronization signal V, to a control signal generation unit 203.

The control signal generation unit 203 generates image signal data based on the RGB data that is supplied from the video decoder 202, and supplies the image signal data, together with the horizontal synchronization signal H and the vertical synchronization signal V, to a video encoder 204. The control signal generation unit 203 generates an intensity control signal which controls light emitting diode units of a back light 208 individually according to the brightness of the image signal, and supplied the intensity control signal to a back light drive control unit 209.

The video encoder 204 synchronizes with the horizontal synchronization signal H and the vertical synchronization signal V, and supplies each of the control signals for operating a data driver 205 and a gate driver 206.

The data driver 205 is a drive circuit that outputs drive voltages based on the image signal, and generates and outputs a signal to be applied to the data line based on the timing signal and the image signal that are transmitted from the video encoder 204. The gate driver 206 is a drive circuit that generates signals for sequential driving, and outputs drive voltages to a gate bus line which is connected to the pixels in the liquid crystal display panel 207 according to the timing signal that is transmitted from the video encoder 204.

The liquid crystal display panel 207 includes a plurality of pixels which are, for example, arranged in a grid shape. In the liquid crystal display panel 207, liquid crystal molecules that have a predetermined orientation state are enclosed between transparent plates of glass or the like, and an image is displayed according to the application of a signal from outside. As described above, the application of signals to the liquid crystal display panel 207 is executed by the data driver 205 and the gate driver 206.

The back light 208 is a light source that is arranged in the rear of the liquid crystal display panel 207, and emits the display content of the liquid crystal display panel 207 toward the front as light. In the present embodiment, the back light 208 is disposed directly under the liquid crystal display panel 207, and is formed of a plurality of light emitting diode units (not shown).

The back light drive control unit 209 controls the brightness individually for each light emitting diode unit of the back light 208 according to the intensity control signal that is supplied from the control signal generation unit 203. The back light drive control unit 209 is capable of controlling the intensity of each light emitting diode unit corresponding to the amount of power that is supplied from a power source 210.

In the present embodiment, it is assumed that the image display device 100 illustrated in FIGS. 1 and 2 has the ability to display an HDR image.

On the other hand, in consideration of the fact that many household television receivers support SDR, the broadcast signal that is received by the antenna 101 is an SDR image in which the dynamic range is subjected to Knee compression. In order to view television programming of an SDR image as an HDR image using the image display device 100, the received SDR image may be subjected to a Knee expansion process.

However, when the method of Knee compression is only transmitted in an incomplete form or is not transmitted at all from the broadcasting station (or the source that supplies the image), it may not be possible to ascertain an accurate method of performing the Knee expansion at the reception side. When inaccurate Knee expansion is performed, a problem arises in that the hue changes.

In order to restore an image that is converted from HDR to SDR using Knee compression to the original HDR image using Knee expansion, the method of Knee compression, that is, the information of the Knee point and the maximum luminance level is necessary.

Even if it is possible to attain the information relating to the method of Knee compression, it may be difficult to ascertain which of a Y-Contrast block (that is, in FIG. 2, before conversion to an RGB signal by the video encoder 204) or an RGB block (that is, in FIG. 2, after conversion to an RGB signal by the video encoder 204) has to be used when performing the Knee expansion.

Figure 3:
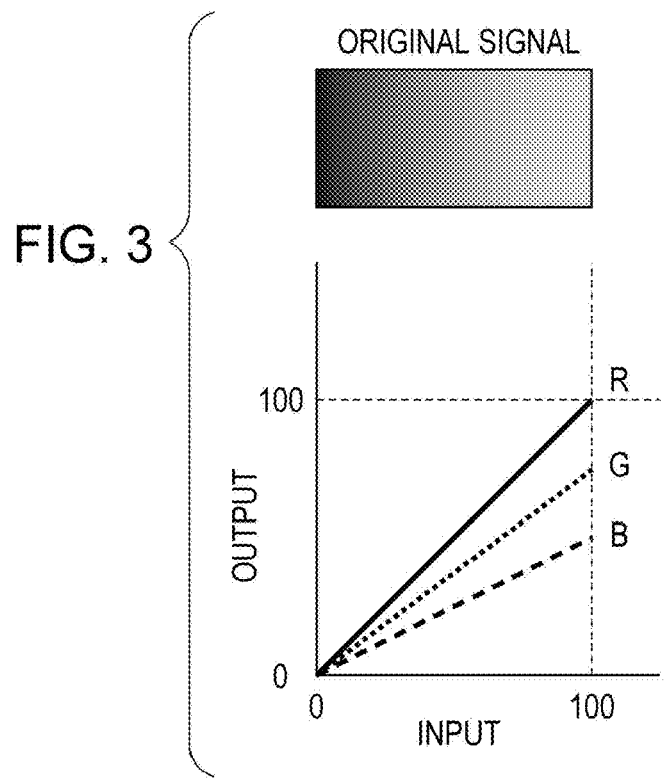
FIG. 3 is a diagram exemplifying an original signal.
Figure 4:
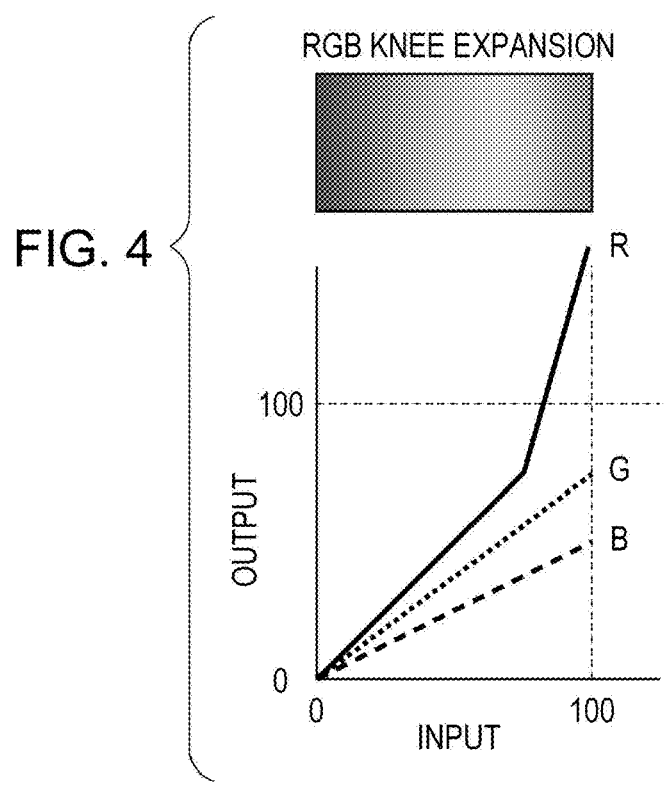
FIG. 4 is a diagram illustrating the result of subjecting only an R component of the original signal illustrated in FIG. 3 to Knee expansion.
Figure 5:
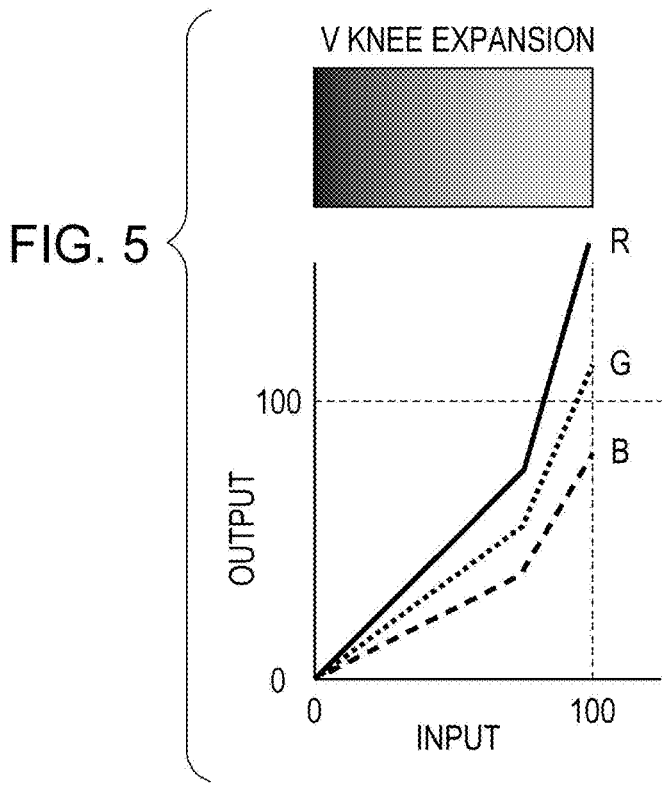
FIG. 5 is a diagram illustrating the result of subjecting each of RGB components of the original signal illustrated in FIG. 3 to Knee expansion.

Consideration will be given to the RGB signals of the original signal, that is, the SDR image that is received by broadcast wave, using the example illustrated in FIG. 3. FIG. 4 illustrates the result of subjecting only the R component of the original signal to Knee expansion in RGB color space. In this case, since only red is emphasized in the high luminance region, the hue differs from the original signal. In other words, the result is an HDR image without upward compatibility to the SDR image before the Knee expansion. Therefore, in order to convert the SDR image into an HDR image without a change in hue, it is necessary to subject each component of RGB to Knee expansion as illustrated in FIG. 5. In this case, information of the Knee compression is necessary for each component of RGB.

In order to enjoy television programming that is broadcast as an SDR image as the original HDR image using an HDR compatible display, the received SDR image may be subjected to Knee expansion processing. The method of Knee compression can be defined using Knee points, that is, an input luminance position and an output luminance position at which the suppression of the signal level is started, and the maximum luminance level to be suppressed to. However, when the method of Knee compression is only transmitted in an incomplete form or is not transmitted at all from the broadcasting station (or the source that supplies the image), an accurate method of performing the Knee expansion at the reception side becomes unknown. When inaccurate Knee expansion is performed, a problem arises in that the hue changes.

Example 1

Figure 6:
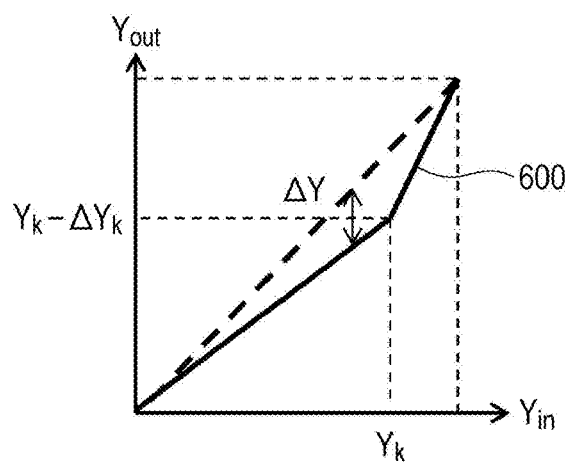
FIG. 6 is a diagram exemplifying a Knee expansion curve in which a luminance signal is subjected to Knee expansion.

Performing the Knee expansion using the Y-Contrast block is proposed as the first example. FIG. 6 is exemplifies a Knee expansion curve 600 in which a luminance signal Y is subjected to Knee expansion. In FIG. 6, the horizontal axis is an input luminance signal $Y_{in}$, and the vertical axis is an output luminance signal $Y_{out}$. The illustrated Knee expansion curve 600 has an output luminance position $Y_k - \Delta Y_k$ in which, the luminance is reduced by $\Delta Y_k$ at the input luminance position $Y_k$. Here, $\Delta Y_k$ should be determined in consideration of the hardware performance of the image display device 100 in addition to information relating to the method of Knee compression such as the Knee point.

Figure 7:
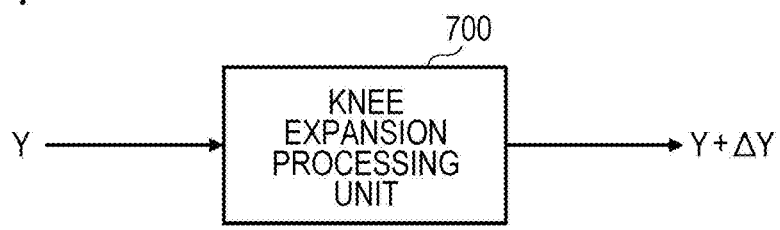
FIG. 7 is a diagram schematically illustrating a functional configuration in which a luminance signal is subjected to a Knee expansion process by a Y-Contrast block.

FIG. 7 schematically illustrates a functional configuration in which the luminance signal Y is subjected to a Knee expansion process by the Y-Contrast block. A Knee expansion processing unit 700 receives input of the luminance signal Y, performs the Knee expansion illustrated in FIG. 6, and outputs the luminance signal $Y + \Delta Y$.

Example 2

Figure 8:
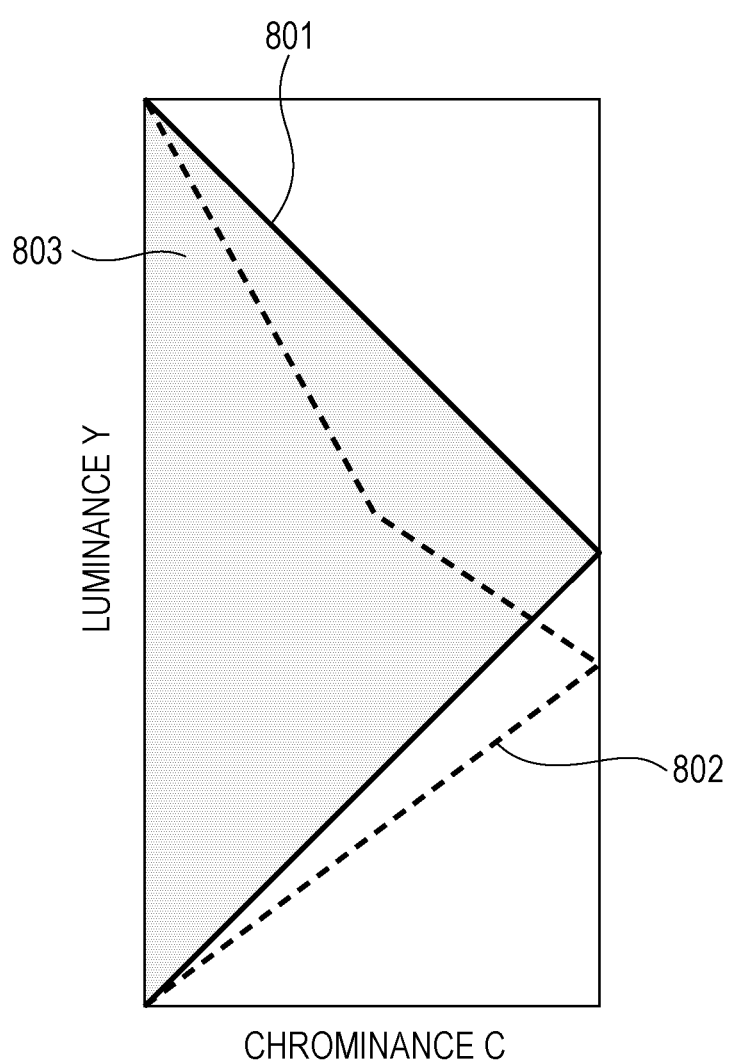
FIG. 8 is a diagram illustrating an input image signal, and an output image signal that is subjected to Knee expansion by the Y-Contrast block.

FIG. 8 illustrates the color distribution of an input image signal 801 and an output image signal 802 that is subjected to Knee expansion by the Y-Contrast block as chrominance on the horizontal axis, and the luminance signal Y as the vertical axis on a graph. From FIG. 8, by simply performing the Knee expansion using the Y-Contrast block as illustrated in FIG. 6, it can be understood that there is a problem in which a portion of the output image signal falls outside of the display color gamut that is depicted using reference numeral 803.

Therefore, subjecting the luminance signal Y to Knee expansion using the Y-Contrast block, subsequently correcting the chroma signal C, and ensuring that the signal does not fall outside of the display color gamut is proposed as the second example. Specifically, the changing of the chroma signal C is a process of ensuring that the ratio of the luminance signal Y to the chroma signal C, that is, Y/C, is fixed.

Figure 9:
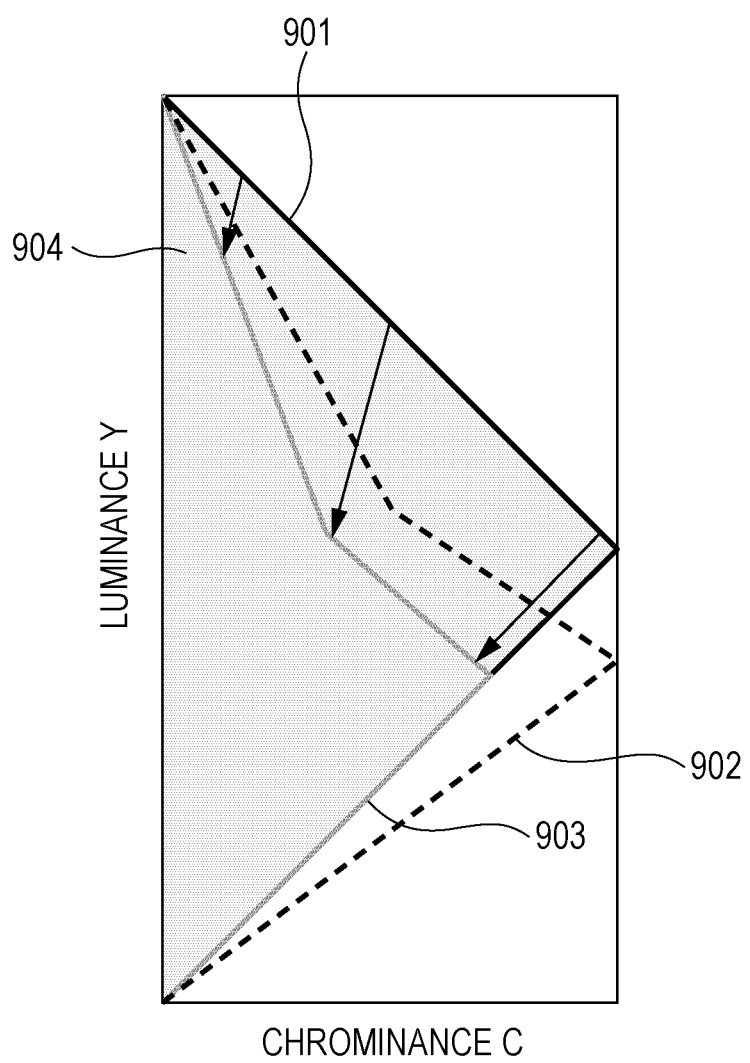
FIG. 9 is a diagram illustrating a result of subjecting the luminance signal to Knee expansion using the Y-Contrast block and subsequently correcting a chroma signal such that Y/C is fixed.

FIG. 9 illustrates a result 903 of subjecting an input image signal 901 to Knee expansion using the Y-Contrast block to obtain a signal 902, and further correcting the chroma signal C of the signal 902 such that Y/C is fixed. As illustrated, it is possible to keep the output image within a display color gamut 904.

Figure 10:
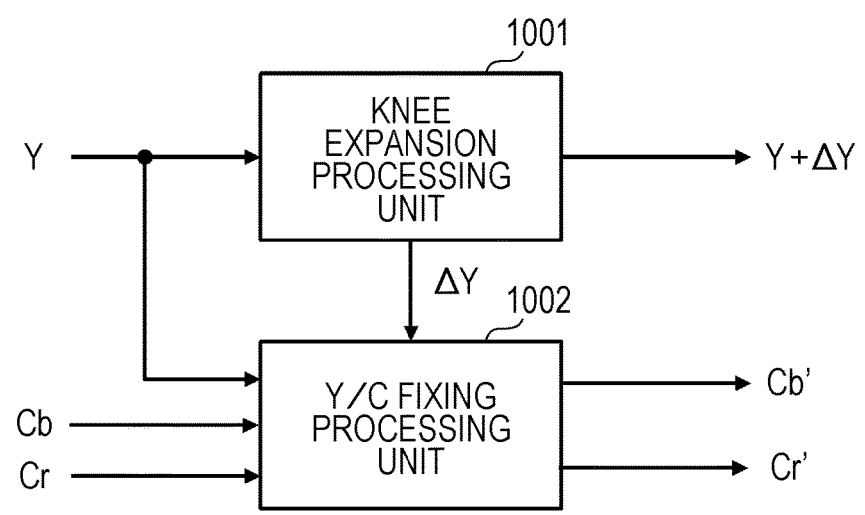
FIG. 10 is a diagram schematically illustrating a functional configuration in which the luminance signal is subjected to Knee expansion by the Y-Contrast block, and the chroma signal is corrected such that Y/C is fixed.

FIG. 10 schematically illustrates a functional configuration in which the luminance signal Y is subjected to Knee expansion by the Y-Contrast block, and the chroma signal is corrected such that Y/C is fixed.

A Knee expansion processing unit 1001 receives input of the luminance signal Y, performs the Knee expansion illustrated in FIG. 6, and outputs the luminance signal $Y + \Delta Y$.

A Y/C fixing processing unit 1002 subjects the luminance signal Y to Knee expansion to $Y + \Delta Y$, subsequently receives input of the input luminance signal Y and the chroma signals Cb and Cr, receives input of $\Delta Y$ from the Knee expansion processing unit 1001, and corrects the input chroma signals Cb and Cr such that the ratio of the luminance signal Y to the chroma signal C is fixed. Specifically, the input chroma signals Cb and Cr are corrected to output chroma signals Cb' and Cr' according to equations (1) and (2) below.

$$C'_b = C_b \times (1 + \Delta Y/Y) \quad (1)$$

$$C'_r = C_r \times (1 + \Delta Y/Y) \quad (2)$$

Example 3

A color distribution 1101 of an HDR image that is captured using a digital still camera or the like falls greatly outside of the display color gamut. Therefore, while the HDR image is compressed, there is a case in which even the post-compression color distribution falls outside of the display color gamut.

Figure 11:
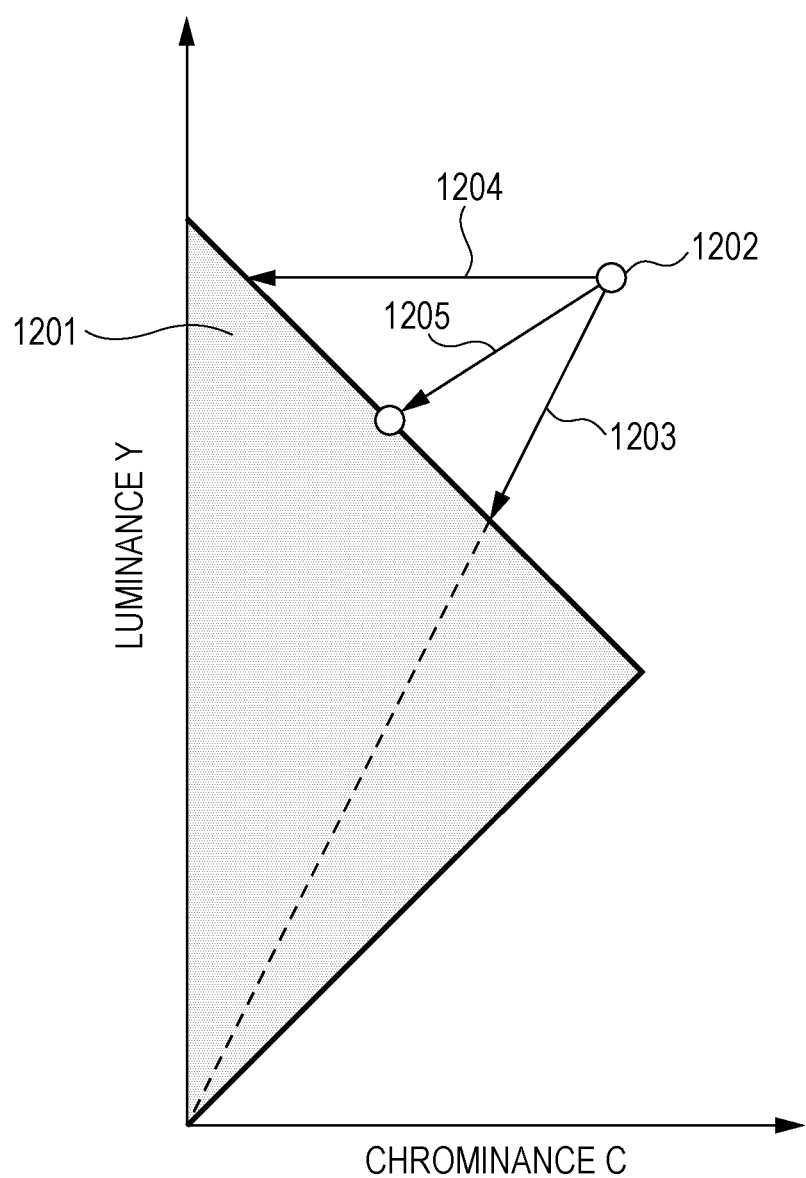
FIG. 11 is a diagram illustrating states of subjecting a color distribution that falls outside of a display color gamut to each of Y compression which compresses in a luminance direction to prioritize hue, C compression which compresses in a saturation direction to prioritize luminance, and YC compression which blends and compresses the luminance and the saturation.

Therefore, as illustrated in FIG. 11, subjecting a color distribution 1202 that falls outside of a display color gamut 1201 to each of Y compression 1203 which compresses in the luminance direction to prioritize hue, C compression 1204 which compresses in the saturation direction to prioritize luminance, and YC compression 1205 which blends and compresses the luminance and the saturation is common practice. According to the YC compression, it is possible to prevent grayscale banding and color loss.

Figure 12:
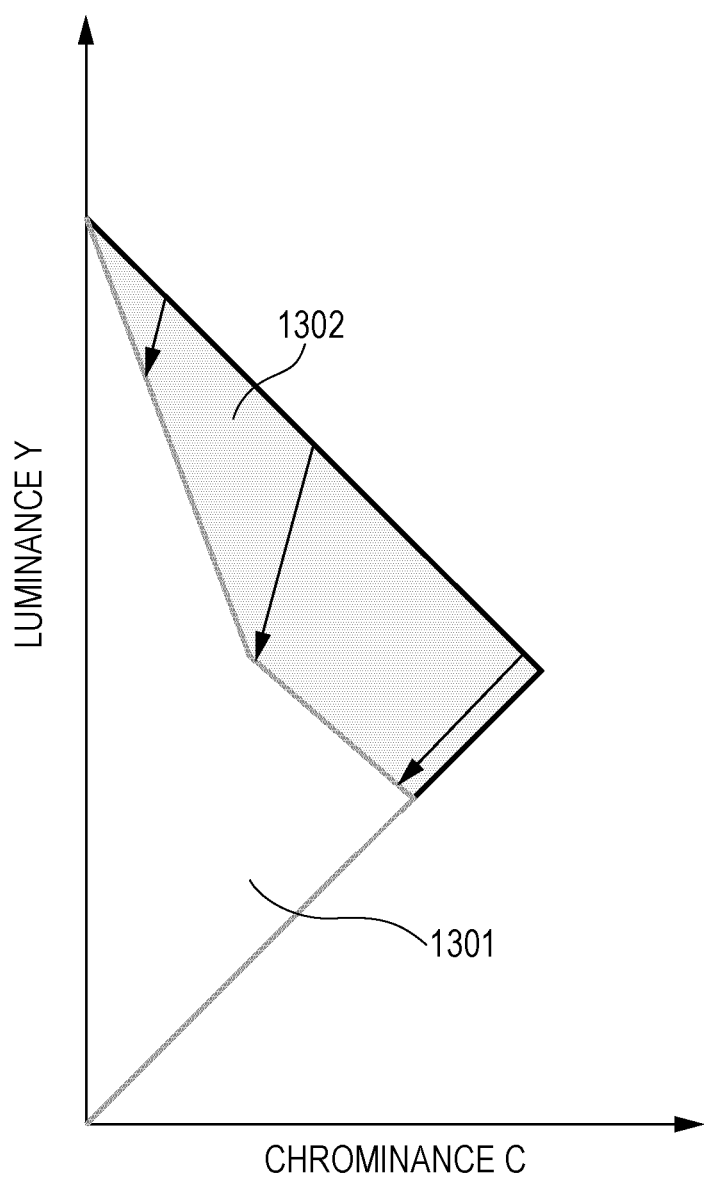
FIG. 12 is a diagram illustrating a state in which an unused region arises in the display color gamut as a result of correcting the chroma signal such that the ratio of the luminance signal to the chroma signal is fixed between before and after the expansion of the luminance signal according to a second example.

Meanwhile, as in the second example, when the chroma signal is corrected such that the ratio of the luminance signal to the chroma signal is fixed between before and after the expansion of the luminance signal, as illustrated in FIG. 12, a wasteful region 1302 that is not used in the display of the HDR image is generated in a display color gamut 1301.

Therefore, correcting the chroma signal such that the ratio of the luminance signal Y to the chroma signal C, Y/C, is fixed, and subsequently subjecting the chroma signal C to an expansion process such that the chroma signal C is suitable for HDR image display is proposed as the third example.

Figure 13:
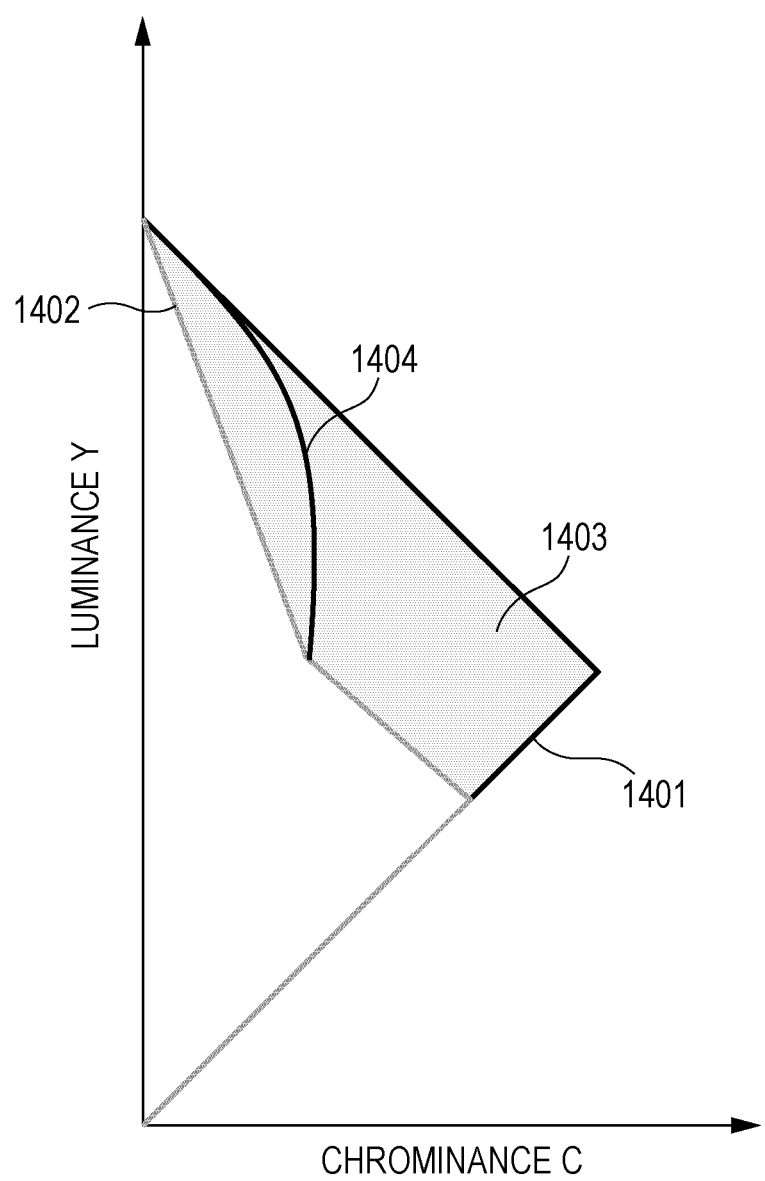
FIG. 13 is a diagram illustrating, in relation to a result of subjecting an input image signal to Knee expansion using the Y-Contrast block and correcting the chroma signal such that Y/C is fixed, a result of further subjecting the chroma signal to an expansion process in a range that does not fall outside of a display color gamut.

FIG. 13 illustrates, in relation to a result 1402 of subjecting an input image signal 1401 to Knee expansion using the Y-Contrast block and correcting the chroma signal C such that Y/C is fixed, a result 1404 of further subjecting the chroma signal to an expansion process in a range that does not fall outside of a display color gamut 1403.

Figure 14:
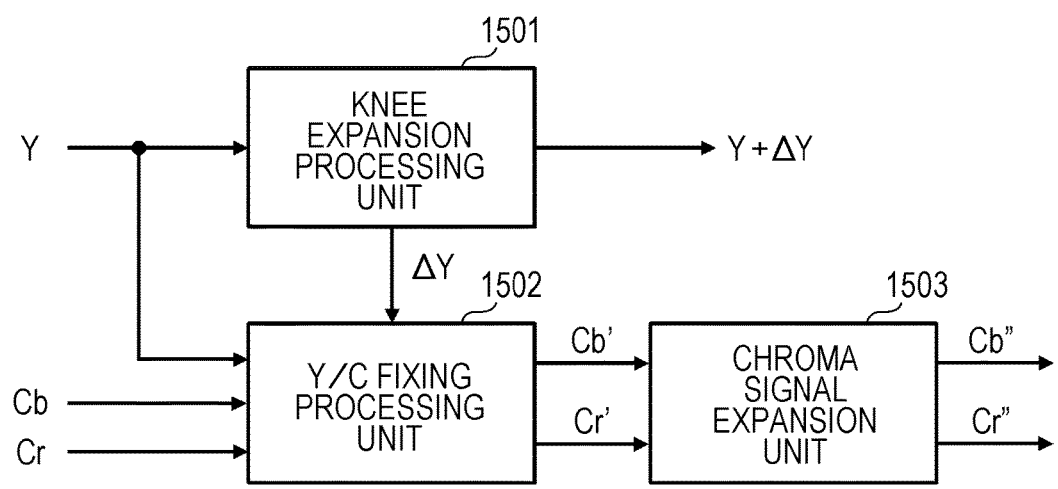
FIG. 14 is a diagram schematically illustrating a functional configuration in which the luminance signal is subjected to Knee expansion by the Y-Contrast block, and the chroma signal is corrected such that Y/C is fixed and is subsequently expanded.

FIG. 14 schematically illustrates a functional configuration in which the luminance signal Y is subjected to Knee expansion by the Y-Contrast block, and the chroma signal is corrected such that Y/C is fixed and is subsequently expanded.

A Knee expansion processing unit 1501 receives input of the luminance signal Y, performs the Knee expansion illustrated in FIG. 6, and outputs the luminance signal $Y+\Delta Y$.

A Y/C fixing processing unit 1502 subjects the luminance signal Y to Knee expansion to $Y+\Delta Y$, subsequently receives input of the input luminance signal Y and the chroma signals Cb and Cr, receives input of $\Delta Y$ from the Knee expansion processing unit 1501, corrects the input chroma signals Cb and Cr according to the equations (1) and (2) described above such that the ratio of the luminance signal Y to the chroma signal C is fixed, and outputs Cb' and Cr'.

A chroma signal expansion unit 1503 subjects the corrected chroma signals Cb' and Cr' to an expansion process. The chroma signal expansion unit 1503 subjects the chroma signals Cb' and Cr' to the expansion process in a range that does not fall outside of the display color gamut. Specifically each of the chroma signals Cb' and Cr' is multiplied by $(1+\alpha)$. Here, $\alpha$ satisfies the following condition (3). Where $Y_k$ is the curve point.

$$\left. \begin{array}{l} \text{if } Y \leq Y_k \\ \text{then } \alpha = 0 \\ \text{if } Y_k < Y < 1 \\ \text{then } \alpha = (Y - Y_k)/(1 - Y_k) \times (Y_k - \Delta Y_k)/Y_k \end{array} \right\} \quad (3)$$

The relationships of the input luminance signal Y and the input chroma signals Cb and Cr with the output chroma signals Cb'' and Cr'' are as indicated in the following equations (4) and (5), respectively.

$$C''_b = C_b \times (1+\Delta Y/Y) \times (1+\alpha) \quad (4)$$

$$C''_r = C_r \times (1+\Delta Y/Y) \times (1+\alpha) \quad (5)$$

Note that, the technology disclosed in the present specification may be configured as described below.

(1) An image processing device, including a luminance signal expansion unit which expands a luminance signal, and a chroma signal correction unit which corrects a chroma signal in a manner adjusted to the expansion of the luminance signal.

(2) The image processing device according to (1), in which the chroma signal correction unit corrects the chroma signal such that a ratio of the luminance signal to the chroma signal is fixed between before and after the expansion of the luminance signal by the luminance signal expansion unit.

(3) The image processing device according to (2), further including a chroma signal expansion unit which expands the chroma signal after the chroma signal is corrected by the chroma signal correction unit.

(4) The image processing device according to (3), in which the chroma signal expansion unit expands the chroma signals in a range that does not fall outside of a display color gamut.

(5) An image processing method, including expanding a luminance signal, and correcting a chroma signal in a manner adjusted to the expansion of the luminance signal.

(6) An image display device, including a luminance signal expansion unit which expands a luminance signal, a chroma signal correction unit which corrects a chroma signal in a manner adjusted to the expansion of the luminance signal, and a display unit which converts the luminance signal and the chroma signal into an RGB signal and displays the RGB signal.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
   circuitry configured to:
   expand a luminance signal based on an input luminance position and an output luminance position at which suppression of the luminance signal level starts where the luminance signal Y becomes $Y+\Delta Y$;
   correct a chroma signal based on a first ratio of the luminance signal to the chroma signal, wherein the first ratio is a fixed ratio,
   wherein the corrected chroma signal is determined from the following:

$$C' = C \times (1+\Delta Y/Y),$$

wherein C is the chroma signal,
   C' is the corrected chroma signal,
   $\Delta Y$ is an amount of expansion in the expanded luminance signal, and
   Y is the luminance signal; and
   expand the corrected chroma signal based on a first expansion factor of a first luminance value and a second expansion factor of a second luminance value.

2. The image processing device according to claim 1, wherein the circuitry is further configured to expand the corrected chroma signal in a range, and
wherein the expanded corrected chroma signal falls in a display color gamut.

3. The image processing device according to claim 1, wherein a second ratio of the expanded luminance signal to the corrected chroma signal is same as the first ratio.

4. The image processing device according to claim 2, wherein the first expansion factor of the first luminance value is greater than a curve point, and the second expansion factor of the second luminance value is less than or equal to the curve point.

5. The image processing device according to claim 4,
wherein the first expansion factor is based on a value of the curve point, and
wherein the second expansion factor is zero.

6. An image processing method, comprising:
expanding a luminance signal based on an input luminance position and an output luminance position at which suppression of the luminance signal level starts where the luminance signal Y becomes Y+ΔY;
correcting a chroma signal based on a first ratio of the luminance signal to the chroma signal, wherein the first ratio is a fixed ratio,
wherein the corrected chroma signal is determined from the following:

$$C'=C\times(1+\Delta Y/Y),$$

wherein C is the chroma signal,
C' is the corrected chroma signal,
ΔY is an amount of expansion in the expanded luminance signal, and
Y is the luminance signal; and
expanding the corrected chroma signal based on a first expansion factor of a first luminance value and a second expansion factor of a second luminance value.

7. An image display device, comprising:
circuitry configured to:
expand a luminance signal based on an input luminance position and an output luminance position at which suppression of the luminance signal level starts where the luminance signal Y becomes Y+ΔY;
correct a chroma signal based on a first ratio of the luminance signal to the chroma signal, wherein the first ratio is a fixed ratio,
wherein the corrected chroma signal is determined from the following:

$$C'=C\times(1+\Delta Y/Y),$$

wherein C is the chroma signal,
C' is the corrected chroma signal,
ΔY is an amount of expansion in the expanded luminance signal, and
Y is the luminance signal;
expand the corrected chroma signal based on a first expansion factor of a first luminance value and a second expansion factor of a second luminance value;
convert the luminance signal and the chroma signal into an RGB signal; and
display the RGB signal.

8. An image processing device, comprising:
circuitry configured to:
expand a luminance signal based on an input luminance position and an output luminance position at which suppression of the luminance signal level starts where the luminance signal Y becomes Y+ΔY;
correct a chroma signal based on a ratio of the luminance signal to the chroma signal, wherein the ratio is a fixed ratio; and
expand the corrected chroma signal based on a first expansion factor for a first luminance value greater than a curve point and expand the corrected chroma signal based on a second expansion factor for a second luminance value less than or equal to the curve point,
wherein the first expansion factor is determined from the following:

$$(Y-Y_k)/(1-Y_k)\times(Y_k-\Delta Y_k)/Y_k,$$

wherein Y is the first luminance value and $Y_k$ is a value of the curve point, and
wherein the second expansion factor is zero.

* * * * *